US011498048B2

(12) United States Patent
Farmer et al.

(10) Patent No.: US 11,498,048 B2
(45) Date of Patent: *Nov. 15, 2022

(54) COMPOSITION CONTAINING UREA FOR USE IN BRINE FORMATION

(71) Applicant: W.M. Barr & Company, Inc., Memphis, TN (US)

(72) Inventors: Rachel Ann Farmer, Memphis, TN (US); Dennis Earl Shireman, Marion, AR (US); Charles L. Hawes, Cordova, TN (US); Brett Justin Healey, Memphis, TN (US); Matthew Michael Petkus, Memphis, TN (US)

(73) Assignee: W.M. Barr & Company, Inc., Memphis, TN (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/157,275

(22) Filed: Oct. 11, 2018

(65) Prior Publication Data

US 2019/0111408 A1    Apr. 18, 2019

Related U.S. Application Data

(60) Provisional application No. 62/571,825, filed on Oct. 13, 2017.

(51) Int. Cl.
*B01J 20/04* (2006.01)
*B01J 20/22* (2006.01)
(Continued)

(52) U.S. Cl.
CPC .......... *B01J 20/046* (2013.01); *B01D 53/261* (2013.01); *B01D 53/263* (2013.01); *B01J 20/22* (2013.01);
(Continued)

(58) Field of Classification Search
CPC . B01J 20/046; B01J 20/12; B01J 20/22; B01J 20/223; B01J 20/24; B01J 20/28016;
(Continued)

(56) References Cited

U.S. PATENT DOCUMENTS 2,951,812 A * 9/1960 Rapp ................... B01J 20/00
252/194
3,390,511 A    7/1968 Norton
(Continued)

FOREIGN PATENT DOCUMENTS

CN      1194175 A     9/1998
CN    200970368 Y    11/2007
(Continued)

OTHER PUBLICATIONS https://web.archive.org/web/20110202050824/https://www.ecompressedair.com/desiccant/deliquescent-tablets.aspx (Year: 2011).*
(Continued)

*Primary Examiner* — Jonathan Miller
*Assistant Examiner* — Gabriel E Gitman
(74) *Attorney, Agent, or Firm* — Nelson Mullins Riley & Scarborough LLP

(57) ABSTRACT

A composition for use in brine formation comprising a deliquescent desiccant, urea, and an optional component selected from the group consisting of starch, citric acid, clay, glucose, and a combination thereof. Methods of making and using the composition are provided. The composition may be pressed into tablet form. The composition may be used in a dehumidifying device.

23 Claims, 10 Drawing Sheets

(51) Int. Cl.
  *B01D 53/26* (2006.01)
  *B01J 20/28* (2006.01)
  *B01J 20/24* (2006.01)
  *B01D 53/28* (2006.01)

(52) U.S. Cl.
  CPC ............ *B01J 20/223* (2013.01); *B01J 20/24* (2013.01); *B01J 20/2805* (2013.01); *B01J 20/28016* (2013.01); *B01J 20/28042* (2013.01); *B01D 53/28* (2013.01); *B01D 2251/302* (2013.01); *B01D 2251/306* (2013.01); *B01D 2251/402* (2013.01); *B01D 2251/404* (2013.01); *B01D 2253/112* (2013.01); *B01D 2253/20* (2013.01); *B01D 2253/25* (2013.01); *B01D 2259/4508* (2013.01); *B01D 2259/4525* (2013.01)

(58) Field of Classification Search
  CPC ............ B01J 20/28042; B01J 20/2805; B01J 20/3035; B01J 2220/42; B01J 2220/46; B01D 53/261; B01D 53/263; B01D 53/28; B01D 2251/302; B01D 2251/306; B01D 2251/402; B01D 2251/404; B01D 2253/112; B01D 2253/20; B01D 2253/25; B01D 2259/4508; B01D 2259/4525
  See application file for complete search history.

(56) References Cited

U.S. PATENT DOCUMENTS

| | | | |
|---|---|---|---|
| 3,549,549 A | 12/1970 | Henderson et al. | |
| 4,459,368 A | 7/1984 | Jaffee et al. | |
| 5,773,105 A | 6/1998 | Klett | |
| 5,907,908 A * | 6/1999 | Cunanan | B01D 53/263 34/61 |
| 5,917,110 A * | 6/1999 | Kust | C05D 3/00 71/27 |
| 5,935,304 A | 8/1999 | Shelley et al. | |
| 6,217,701 B1 | 4/2001 | Shelley et al. | |
| 6,235,219 B1 | 5/2001 | Beckenhauer | |
| 6,281,407 B1 | 8/2001 | Warner et al. | |
| 6,540,937 B1 | 4/2003 | Payne et al. | |
| 6,649,086 B2 | 11/2003 | Payne et al. | |
| 6,652,775 B2 | 11/2003 | Payne et al. | |
| 6,716,276 B2 | 4/2004 | Loop et al. | |
| 6,932,982 B2 * | 8/2005 | McIver | A61K 8/11 424/484 |
| 7,615,269 B2 | 11/2009 | Payne et al. | |
| 7,825,066 B1 | 11/2010 | Skaggs et al. | |
| 7,857,896 B2 | 12/2010 | Magargee et al. | |
| 8,262,926 B2 | 9/2012 | Kassouni | |
| 9,005,351 B2 | 4/2015 | Tornel Garcia | |
| 11,148,118 B2 * | 10/2021 | Farmer | B01J 20/046 |
| 2002/0014305 A1 * | 2/2002 | Dick | B32B 1/06 156/308.4 |
| 2002/0026872 A1 | 3/2002 | Smith | |
| 2002/0083832 A1 | 7/2002 | Smith | |
| 2004/0018278 A1 | 1/2004 | Popplewell et al. | |
| 2005/0223584 A1 | 10/2005 | Jones et al. | |
| 2006/0016765 A1 | 1/2006 | DiPietro et al. | |
| 2006/0018940 A1 | 1/2006 | DiPietro et al. | |
| 2008/0207434 A1 | 8/2008 | Martinez | |
| 2012/0103422 A1 * | 5/2012 | Durham | F16L 58/00 137/1 |
| 2015/0209712 A1 | 7/2015 | Beckenhauer | |
| 2017/0165314 A1 | 6/2017 | Hisatsune et al. | |
| 2017/0217661 A1 * | 8/2017 | Erickson | A01N 25/18 |
| 2019/0111408 A1 | 4/2019 | Farmer et al. | |

FOREIGN PATENT DOCUMENTS

| | | | |
|---|---|---|---|
| CN | 103521044 A | | 1/2014 |
| GB | 1056614 A * | 1/1967 | ............ B01D 53/26 |
| GB | 1056614 A * | 1/1967 | ............ B01D 53/26 |
| WO | 01/35764 A1 | | 5/2001 |
| WO | 02/089862 A2 | | 11/2002 |
| WO | 2016/203152 A1 | | 12/2016 |
| WO | 2016203150 A1 | | 12/2016 |

OTHER PUBLICATIONS

International Search Report and Written Opinion of corresponding application PCT/US2018/055538, dated Dec. 14, 2018, all enclosed pages cited.
International Search Report and Written Opinion of corresponding application PCT/US2018/055537, dated Jan. 8, 2019, all enclosed pages cited.
Skvortsova, ZN, et al. Recrystallization creep of sodium chloride in solutions with different compositions: 2. The effect of urea additives. Colloid journal. Oct. 1, 2008. vol. 70. No. 5; p. 629.
Ebersten, RB. Effect of Sugar as an Additive on the Longevity of Salt on Pavements. Master's thesis, NTNU, 2015; p. 31 [online], [retrieved on Nov. 18, 2018]. Retrieved from the Internet URL: https://brage.bibsys.no/xm/ui/bitstream/handle/11250/2349760/13096_FULLTEXT.pdf?sequence=1 >.
Supplementary European Search Report, European Application No. EP 18867284, dated Jul. 28, 2021, 2 pages.
Supplementary European Search Report, European Application No. EP 18865820, dated Jun. 8, 2021, 2 pages.

* cited by examiner

COMPOSITION CONTAINING UREA FOR USE IN BRINE FORMATION

CROSS-REFERENCE TO RELATED APPLICATIONS

This application claims priority from U.S. provisional patent application No. 62/571,825, filed on Oct. 13, 2017, in the United States Patent and Trademark Office. The disclosure of which is incorporated herein by reference in its entirety.

FIELD OF THE INVENTION

The present invention relates to a composition for use in brine formation and a dehumidifying device having the composition therein.

BACKGROUND OF THE INVENTION

Atmospheric water vapor in high humidity environments can be problematic to personal articles, clothing for example, and other items which are susceptible to corrosion, mold, mildew, and other types of water related damage and deterioration. Also, the interior of vehicles, boats and airplanes that are subjected to wet and humid weather conditions can develop odors as well as mildew and mold, and can rot from constant exposure to humid air. Homes with poor sealing, especially in rainy climates are especially vulnerable to damage caused by humidity. For these reasons the consumer desires dehumidifying products that will act quickly to remove moisture fast when they are experiencing immediate moisture threats from large storms and flooding, and products that will last a long time when they are trying to maintain a healthy humidity level for storage of items.

One of the most common chemistries used in deliquescent dehumidifying devices is calcium chloride ($CaCl_2$). Devices on the market today have a couple of different designs of using calcium chloride to extract the moisture from the air.

One of the most common devices on the market includes a basket and reservoir design. In this design the consumer will dump a bag of flake or pelleted calcium chloride into a porous basket. As the calcium chloride absorbs moisture, it turns into liquid brine and will drain and collect into a basin which is underneath the basket. At the end of the life of the product, the consumer dumps the brine out of the bottom reservoir and refills the basket with more calcium chloride. One of the issues that consumers might experience with these devices is when the temperature or high humidity conditions drop within their house. This can cause the liquid brine to start to recrystallize and cause "icicles" to form on the basket which can clog the pores which allow drainage. This could lead to product overflow when humidity and temperatures jump to higher levels. It can also make the brine that has been collected in the bottom reservoir turn into a solid calcium chloride brick. This makes it very inconvenient for the consumer to dump out and reuse the plastic housing.

Another common device on the market includes calcium chloride being placed inside a sealed bag. These bags typically have a moisture barrier built into the design which allows humidity to enter inside the bag and be absorbed by the calcium chloride contained within the bag. These bags can have a single compartment design where pelleted, flaked, or granular calcium chloride will absorb moisture and turn into a brine puddle in the same single compartment or can be in a multi-cavity bag design where one compartment containing a moisture barrier contains the pelleted or flaked calcium chloride and the other compartment acts as a basin and collects the liquid brine as it is formed. In both single compartment and double compartment designs, brine can once again recrystallize at lower temperature and humidity conditions and form sharp edges which can puncture a bag thereby creating a leak. Another problem seen in a single compartment design is when it is placed in high humidity setting for a long-time period the brine can continue to absorb moisture and continuously expand in volume to a point where it can balloon the bag and cause it to leak. This is due to the fact that 1 lb. of 77% active calcium chloride can absorb up to 14 lb. of water at 95% humidity.

Another common device on the market uses pressed calcium chloride tablets. These device designs are very similar to the porous basket over basin design but consist of a top portion with a single larger drainage port instead of a porous basket. In this design the consumer puts the calcium chloride tablet into the top portion and it would once again drain into a basin. The same issues are seen in this design where when the temperature or high humidity conditions drop within their house the liquid brine starts to recrystallize and block the drainage port to cause overflow outside of the unit.

In addition to designs that prevent leakage and spillage, consumers desire fast acting brine formation. Consumers want to see their desiccants working quickly because it gives them confidence that their product is working quickly to remove excess moisture from their home. Consumers also prefer that their dehumidifying product last a long time to give them long term humidity protection.

Thus, there is a need for new deliquescent desiccant compositions, alternative forms for the compositions, and dehumidifying devices for use with such deliquescent desiccant compositions that address the above needs and concerns.

SUMMARY OF THE INVENTION

In an embodiment of the invention, a composition for use in brine formation comprises a deliquescent desiccant such as calcium chloride ($CaCl_2$) and one or more components that interact with calcium chloride and enhance the rate at which calcium chloride turns from a solid state into a liquid state (brine). The composition is preferably a mixture of solid components. Other deliquescent desiccants that may be used in the present invention include, but are not limited to, magnesium chloride, potassium chloride, lithium chloride, and a combination thereof.

In an embodiment of the invention, a composition for use in brine formation comprises a deliquescent desiccant such as calcium chloride ($CaCl_2$) and urea with one or more optional components that interact with calcium chloride and enhance the rate at which calcium chloride turns from a solid state into a liquid state (brine). The composition is preferably a mixture of solid components.

In an embodiment of the invention, a composition comprising a deliquescent desiccant and a component selected from the group consisting of urea, starch, citric acid, clay, glucose, and a combination thereof is provided.

In an embodiment of the invention, a composition comprising a deliquescent desiccant, urea, and an optional component selected from the group consisting of starch, citric acid, clay, glucose, and a combination thereof is provided.

In an embodiment of the invention, a composition comprising calcium chloride and a component selected from the group consisting of urea, starch, citric acid, clay, glucose, and a combination thereof is provided.

In an embodiment of the invention, a composition comprising calcium chloride, urea, and an optional component selected from the group consisting of starch, citric acid, clay, glucose, and a combination thereof is provided.

In an embodiment of the invention, a method of using the composition comprises adding the composition in a dehumidifying device to increase rate of brine formation and/or prevent brine from recrystallizing with decreasing humidity conditions is provided. A dehumidifying device may take many forms including, but not limited to, a bag, a pouch, basket, tablet, among others.

In an embodiment of the invention, a method of making a composition comprising combining a tablet comprising a deliquescent desiccant and a component selected from the group consisting of urea, sodium citrate, starch, citric acid, clay, glucose and/or other carbohydrates, and a combination thereof.

In an embodiment of the invention, a tablet comprising a deliquescent desiccant, urea, and an optional component selected from the group consisting of sodium citrate, starch, citric acid, clay, glucose, other carbohydrates, and a combination thereof is provided.

In an embodiment of the invention, a method of making a composition comprising combining a tablet comprising a deliquescent desiccant and a component selected from the group consisting of urea, sodium citrate, starch, citric acid, clay, glucose and/or other carbohydrates, and a combination thereof.

In an embodiment of the invention, a method of making a composition comprising combining a tablet comprising a deliquescent desiccant, urea, and an optional component selected from the group consisting of sodium citrate, starch, citric acid, clay, glucose and/or other carbohydrates, and a combination thereof.

In an embodiment of the invention, a dehumidifying device comprising a deliquescent desiccant and a component selected from the group consisting of urea, sodium citrate, starch, citric acid, clay, glucose and/or other carbohydrates, and a combination thereof is provided.

In an embodiment of the invention, a dehumidifying device comprising a deliquescent desiccant, urea, and an optional component selected from the group consisting of sodium citrate, starch, citric acid, clay, glucose and/or other carbohydrates, and a combination thereof is provided.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

Figure 1:
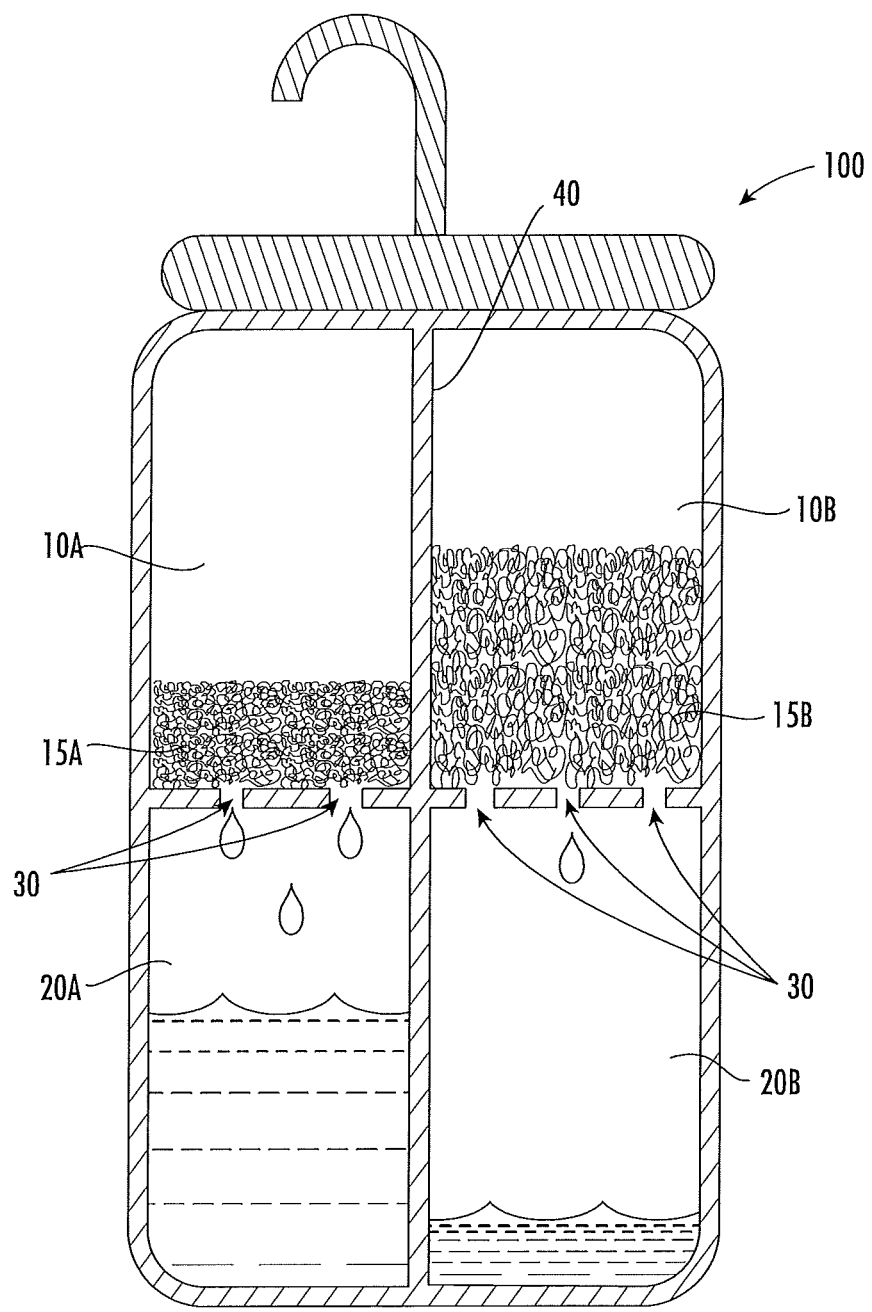
FIG. 1 is an illustration of a multi-compartment hanging bag.

The following description of the embodiments of the present invention is merely exemplary in nature and is in no way intended to limit the invention, its application, or uses. The present invention has broad potential application and utility. The following description is provided herein solely by way of example for purposes of providing an enabling disclosure of the invention, but does not limit the scope or substance of the invention.

Compositions

In an embodiment of the invention, a composition to increase the rate of brine formation is provided. In accordance with certain embodiments, the composition comprises a deliquescent desiccant and urea (also known as carbamide), consists essentially of a deliquescent desiccant and urea (also known as carbamide), or consists of a deliquescent desiccant and urea (also known as carbamide). The deliquescent desiccant is calcium chloride, and calcium chloride is present in an amount greater than 20 weight percent of the composition, preferably greater than 30 weight percent of the composition. The composition comprising calcium chloride and urea is effective for increasing the rate of brine formation. The composition can be in the form of a granular, a pellet, a powder, or a flake mixture. The composition can also be in the form of a compressed tablet comprising calcium chloride and urea.

In an embodiment of the present invention, a composition comprises a deliquescent desiccant and urea, wherein the urea is present in the composition in an amount of up to 50 weight percent, preferably about 1 weight percent to about 50 weight percent of the composition.

In an embodiment of the present invention, a composition comprises calcium chloride and urea, wherein the urea is present in the composition in an amount of up to 50 weight percent, preferably about 1 weight percent to about 50 weight percent of the composition.

In an embodiment of the present invention, a composition comprises a deliquescent desiccant, calcium chloride, and a component selected from the group consisting of urea, sodium citrate, starch, citric acid, clay, glucose, other carbohydrates, and a combination thereof.

In an embodiment of the invention, a composition to increase the rate of brine formation is provided. In accordance with certain embodiments, the composition comprises a deliquescent desiccant and citric acid, consists essentially of a deliquescent desiccant and citric acid, or consists of a deliquescent desiccant and citric acid. The deliquescent desiccant is calcium chloride, and calcium chloride is present in an amount greater than 20 weight percent of the composition, preferably greater than 30 weight % of the composition. The composition is effective for increasing the rate of brine formation. The composition is in the form of a granular mixture, a pellet, a flake, or a powder mixture. The composition can also be in the form of a compressed tablet comprising calcium chloride and citric acid.

In an embodiment of the invention, a composition to increase the rate of brine formation is provided. In accordance with certain embodiments, the composition comprises a deliquescent desiccant and sodium citrate, consists essentially of a deliquescent desiccant and sodium citrate, or consists of a deliquescent desiccant and sodium citrate. The deliquescent desiccant is calcium chloride, and calcium chloride is present in an amount greater than 20 weight percent of the composition, preferably greater than 30 weight percent of the composition. The composition is effective for increasing the rate of brine formation. The composition is in the form of a granular mixture, a pellet, a flake, or a powder mixture. The composition can also be in the form of a compressed tablet comprising calcium chloride and sodium citrate.

In an embodiment of the invention, a composition to increase the rate of brine formation is provided. In accordance with certain embodiments, the composition comprises a deliquescent desiccant and starch, consists essentially of a deliquescent desiccant and starch, or consists of a deliquescent desiccant and starch. The deliquescent desiccant is calcium chloride, and calcium chloride is present in an amount greater than 20 weight percent of the composition, preferably greater than 30 weight percent of the composition. The composition is effective for increasing the rate of brine formation at lower amounts such as 1% to 10% by weight of starch. The composition can be in the form of a granular mixture, a pellet, a flake, or a powder mixture.

In an embodiment of the invention, a composition to increase the rate of brine formation is provided. In accordance with certain embodiments, the composition comprises a deliquescent desiccant and lower levels of clay, consists essentially of a deliquescent desiccant and lower levels of clay, or consists of a deliquescent desiccant and lower levels such as 1% to 10% by weight of clay. The deliquescent desiccant is calcium chloride, and calcium chloride is present in an amount greater than 20 weight percent of the composition, preferably greater than 30 weight percent of the composition. The composition is effective for increasing the rate of brine formation. The composition can be in the form of a granular mixture, a pellet, a flake, or a powder mixture. The composition can also be in the form of a compressed tablet comprising calcium chloride and clay.

In another embodiment of the invention, a composition to increase the rate of brine formation is provided. In accordance with certain embodiments, the composition comprises a deliquescent desiccant and a component selected from the group consisting of starch, citric acid, clay, urea, and a combination thereof, consists essentially of a deliquescent desiccant and a component selected from the group consisting of starch, citric acid, clay, sodium citrate, urea, glucose and/or other carbohydrates, and a combination thereof, or consists of a deliquescent desiccant and a component selected from the group consisting of starch, citric acid, clay, sodium citrate, urea, glucose and/or other carbohydrates, and a combination thereof. Preferably, the deliquescent desiccant is calcium chloride. The composition is effective for increasing the rate of brine formation. The composition can be in the form of a granular mixture, a pellet, a flake mixture, or a powder. The composition can also be in the form of a compressed tablet comprising calcium chloride and a component selected from the group consisting of citric acid, clay, sodium citrate, urea, glucose and/or other carbohydrates, and a combination thereof.

Fragrance, carbohydrate encapsulated fragrance, and fragrance beads as well as other additives may be optionally added to any of the above compositions.

Methods of Using

In an embodiment of the invention, a method of using urea to increase the rate of brine creation from calcium chloride is provided. The method comprises adding urea to calcium chloride. For example, calcium chloride can be used that is 77% active. The weight percent of urea may vary depending upon the calcium chloride activity level. Calcium chloride having a different percentage active is contemplated and still within the scope of the present invention.

Among the advantages in the use of urea are that urea helps calcium chloride form into brine faster, and urea prevents liquid calcium chloride brine from recrystallizing with decreasing humidity conditions. Assisting calcium chloride to form into brine faster is even more important in pouches that contain less Tyvek surface area to allow moisture to come through. It is desirable to prevent brine from recrystallizing in a pouch than can potentially puncture or rupture the pouch with its sharp ends.

In an embodiment of the invention, a method of using citric acid to increase the rate of brine creation from calcium chloride is provided. The method comprises adding citric acid to calcium chloride. For example, calcium chloride can be used that is 77% active. Calcium chloride having a different percentage active is contemplated and still within the scope of the present invention. Preferably, the method comprises adding citric acid to calcium chloride.

In an embodiment of the invention, a method of using starch to increase the rate of brine formation at lower amounts of starch is provided. The method comprises adding starch to calcium chloride. Preferably, the method comprises adding starch to calcium chloride in a lower amount such as 1% to 10% by weight of starch.

Among the advantages in the use of starch are that starch helps calcium chloride form into brine faster when a lower amount such as 1% to 10% by weight of starch is used, starch slows down the absorption of humidity by a liquid brine solution at higher amounts such as 10% to 50% by weight of starch, and that starch used in a higher amount such as 10% to 50% by weight when combined with liquid brine is advantageous to reduce leaks from a pouch and to slow down rate of absorption from the atmosphere. Humidity is a quantity representing the amount of water vapor in the atmosphere.

In an embodiment of the invention, a method of using clay to increase the rate of brine creation from calcium chloride is provided. Preferably, the method comprises adding clay to calcium chloride in an amount of about 1 weight % to about 10 weight % of clay based on the weight of the total composition.

Among the advantages in the use of clay are that clay helps calcium chloride to form into brine faster when a lower amount of clay is used, clay offers leak protection, and clay does not allow brine solution to pass through small holes or seals in a pouch or other container.

In an embodiment of the invention, a method of using a component selected from the group consisting of starch, citric acid, clay, sodium citrate, urea, glucose and/or other carbohydrates, and a combination thereof, to increase the rate of brine creation from calcium chloride is provided. The method comprises adding a component selected from the group consisting of starch, citric acid, clay, sodium citrate, urea, glucose and/or other carbohydrates, and a combination thereof, to calcium chloride. For example, calcium chloride can be used that is 77% active. Calcium chloride having a different percentage active is contemplated and still within the scope of the present invention.

Tablets

In another embodiment of the invention, a tablet is provided wherein the tablet is comprised of a deliquescent desiccant and a component selected from the group consisting of urea, clay, sodium citrate, starch, citric acid, glucose and/or other carbohydrates, and a combination thereof. Preferably, the desiccant is calcium chloride. Starting calcium chloride, for example, may be in the form of a granular mixture, flake, pellet, or powder mixture. It may also be in the form of a heterogeneous mixture of the above.

In another embodiment of the invention, a method of making a tablet is provided. Additives are preferred in powder, pellet or other solid form. The method comprises combining a deliquescent desiccant, preferably calcium chloride, and a component selected from the group consisting of urea, clay, sodium citrate, starch, citric acid, glucose and/or other carbohydrates, magnesium stearate, and a combination thereof, to form a heterogeneous mixture; and pressing the heterogeneous mixture in the form of a tablet. Other deliquescent desiccants that may be used in the present invention include, but are not limited to, magnesium chloride, potassium chloride, lithium chloride, and a combination thereof. Contemplation of other additives for optimal tablet pressing is still within the scope of the present invention.

In an embodiment of the invention, pressed calcium chloride tablet(s) that comprise starch encapsulated fragrance are combined with a granular, pelleted, powder, or flaked calcium chloride heterogeneous mixture. Alternatively, the pressed calcium chloride tablet(s) containing starch encapsulated fragrance may be shattered into smaller pieces of compressed material and included in such a mixture. The pressed calcium chloride tablet(s) could also be used in combination with PEG fragrance beads to achieve an optimal fragrance experience. This composition and method would allow for longer lasting fragrance and complete dissolution of the tablet.

In regard to tablet size, the terms "small" and "smaller" and "large" and "larger" are relative terms to one another. The actual dimensions of such tablets may vary but still be within the scope of the present invention. For example, small may refer to tablets having approximate weights of 1 gram to 150 grams. For example, large tablets may refer to tablets having approximate weights of greater than 150 grams up to 1,000 grams. It can be conceived that the tablets may be comprised of different shapes, but are preferably circular.

Dehumidifying Devices

In an embodiment of the present invention, a dehumidifying device such as a pouch, a hanging bag, or a container is provided. The dehumidifying device comprises a deliquescent desiccant and a component selected from the group consisting of urea, sodium citrate, clay, starch, citric acid, glucose and/or other carbohydrates, and a combination thereof. Preferably, the deliquescent desiccant is calcium chloride. It is conceived that fragrance, fragrance tablets, or fragrance beads could also be included in the mixture.

In an embodiment of the invention, a single cavity dehumidifying device (that can hold 750 ml of water) comprises 10.5 oz. of a composition in a form of a solid mixture having 50 to 80 weight % of $CaCl_2$ (which is 77% active), 15 to 50 weight % of starch, 3 to 20 weight % of urea, and 0 to 10 weight % of fragrance or fragrance beads or fragrance tablets, wherein the weight percent is based on the total weight of the solid mixture. The mixture may optionally comprise other components and/or additives. Pouches, bags, or containers having other volumes are contemplated and still within the scope of the present invention. Calcium chloride having a different percentage active is contemplated and still within the scope of the present invention.

For example, urea (Univar, pellet, 46% nitrogen) is used in the dehumidifying device to create brine faster, and the starch is used to slow down the rate of absorption when it has reached the 100% brine state. Urea has also surprisingly been found to eliminate the formation of stalagmites after the brine state.

In an embodiment of the present invention, a two-compartment hanging bag is provided. The two-compartment hanging bag comprises a first compartment in an upper half of the hanging bag and a second compartment in a lower half of the hanging bag. The first compartment in the upper half of the hanging bag comprises a fast acting deliquescent desiccant comprising calcium chloride mixed with urea to activate quicker and show brine formation faster. Alternatively, the first compartment may comprise any combination of calcium chloride and one or more of urea, sodium citrate, starch, citric acid, clay, and glucose and/or other carbohydrates. There are broken seals, slots, or openings between the first compartment in the upper half and the second compartment in the lower half such that the desiccant can flow into the lower compartment once liquefied. An example of a hanging bag that may be used with the novel compositions of the present invention is described in commonly-owned U.S. Pat. No. 5,907,908, which is incorporated by reference in its entirety herein.

In an embodiment of the present invention, a multi-compartment hanging bag is provided. FIG. 1 is an illustration of a four-compartment hanging bag 100. An upper half of the hanging bag is divided into at least two upper compartments 10A, 10B. A first upper compartment 10A comprises a fast acting deliquescent desiccant 15A such as calcium chloride mixed with 5% urea to activate quicker and show brine formation faster. Alternatively, first upper compartment 10A may comprise any combination of calcium chloride and one or more of urea, sodium citrate, starch, citric acid, clay, and glucose and/or other carbohydrates. A second upper compartment 10B comprises a long-lasting deliquescent desiccant 15B comprising calcium chloride to provide longer lasting humidity control extending the overall life of the product. The upper half of the hanging bag is divided from a lower half of the hanging bag. The lower half may be divided into one or more lower compartments 20A, 20B. There are broken seals, slots, or openings 30 between the upper compartments and the lower compartments such that the desiccant can flow into the lower compartments once liquefied.

Preferably, a heat seal 40 is present down the center of the bag to divide the bag. Heat seal 40 allows for two separate compartments 10A, 10B where various materials may be placed and also two separate compartments 20A, 20B to retain separate moisture that is absorbed. The benefit of this four compartment system is the ability to make the fast acting side the consumer wants while retaining the long lasting feature of hanging bag 100. Giving the consumer the ability to see faster brine formation on one side of the bag shows the consumer that the bag is working initially to remove moisture. Creating a fast acting and long lasting effect may be achieved by packaging or by chemical means. Variation in the type or amount of Tyvek (or other barriers) that permits air flow allows the control of incoming air. This configuration allows for control air flow contacting the $CaCl_2$ thus permitting us to have a faster or slower formation of brine. Another area of manipulation is in the actual composition of the different sides of the pouch. Components including, but not limited to, urea, sodium citrate, starch, clay, citric acid, and glucose and/or other carbohydrates. Pressed $CaCl_2$ tablets may also be present in one or more compartments of the hanging bag. Creating a mixture that is placed on the fast acting side containing one or more of the mentioned above components allows the consumer to see one side of the hanging bag working faster than the other.

EXAMPLES

There is a synergistic effect between the calcium chloride and at least each of urea, starch, citric acid, clay, and glucose as demonstrated by the Examples.

Example—Additives and Acceleration of Brine Creation

Experiments were conducted with various additives to see how they would affect the absorption rate of $CaCl_2$. Several pouches were made up with various substances (including clay and urea) with $CaCl_2$ to make a 10.5 oz. pouch. The pouches (3⅞ inches wide×7.5 inches long, 1 inch side gusset, ½ inch seal at bottom) were placed within a humidity chamber held constant at 26° C. and 80% humidity. Visual observations were made of the pouches. The pouch with urea (Univar, pellet, 46% nitrogen) turned into a brine faster than the other pouches. Urea did not show the greatest weight gain over time even though it turned into a brine faster. This was attributed to a 5 weight % to 10 weight % decrease in $CaCl_2$ within the pouch. Further experiments showed that urea had an effect of faster brine formation.

Urea (Univar, pellet, 46% nitrogen) was added to $CaCl_2$ and tested within a two-compartment container. The container had a top basket where the 5 lb. of $CaCl_2$ sat and a bottom container to catch brine produced from the $CaCl_2$ above. The experiment was conducted with a first two-compartment container holding 10% of its weight in urea and a second two-compartment container with only 5 lb. of $CaCl_2$. These two containers were placed in a humidity chamber and two additional containers were placed in a staircase/stairwell for a real-life simulation. Brine was created in an 80/80 humidity chamber from the two-compartment container containing all $CaCl_2$) versus the two-compartment container containing $CaCl_2$ mixed with 10 weight % urea. Results of the experiment showed that $CaCl_2$ containing urea in both the humidity chamber and the real-life setting (staircase) created brine faster than in the two-compartment container containing only $CaCl_2$.

Brine formed in the container comprised only of $CaCl_2$ that was placed in the humidity chamber but at a much slower rate than the one with 10% urea.

Brine formed in the container comprised of $CaCl_2$ and 10 weight % urea that was placed in the humidity chamber at a faster rate than the container with $CaCl_2$ alone.

Brine was formed in both the control ($CaCl_2$ containing no urea) in the humidity chamber and the container with 10% urea in the humidity chamber. Recrystallization of the brine that had formed was seen in the container that was the control ($CaCl_2$ containing no urea) in the humidity chamber. The container with 10% urea in the humidity chamber weighed in with more brine weight and decreased basket weight than the container that was the control ($CaCl_2$ containing no urea) in the humidity chamber. The container with 10% urea also showed no recrystallization.

Figure 2:
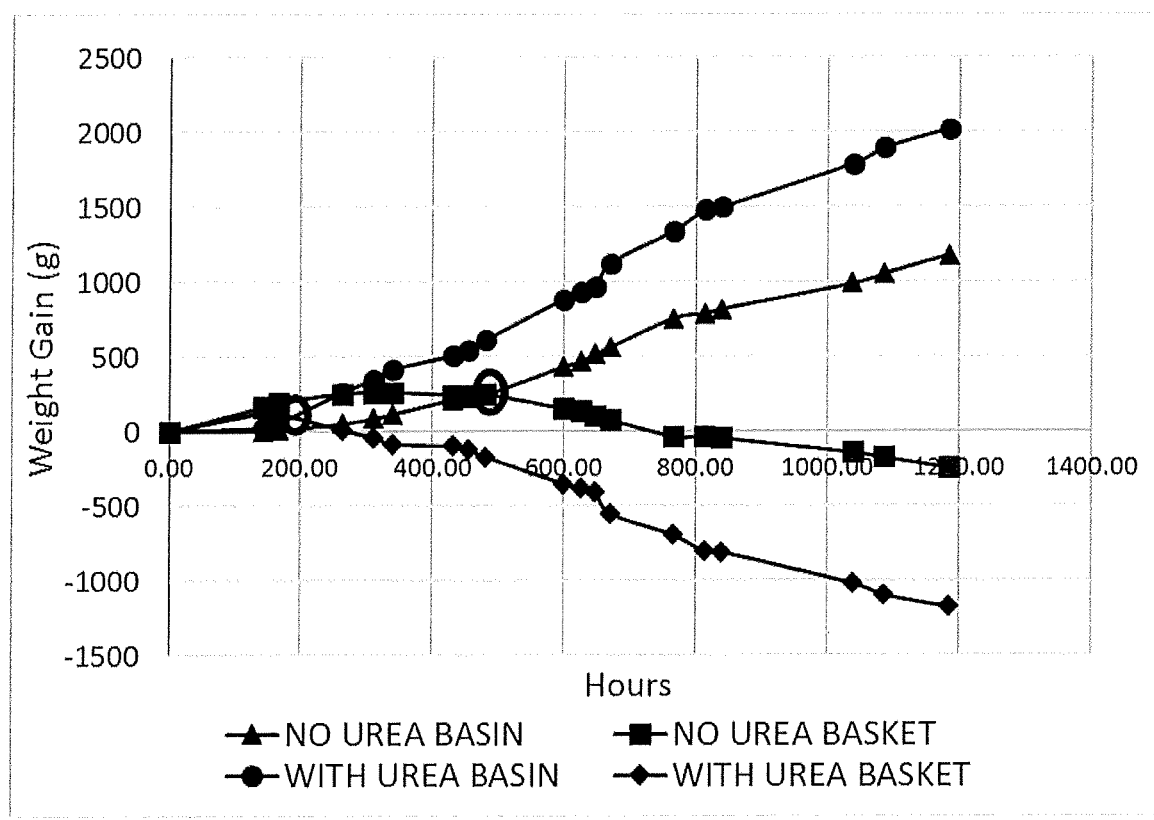
FIG. 2 is a graph depicting the benefit of faster brine formation from adding urea to flake calcium chloride desiccant. The weight of separate compartments (basin, where brine is collected versus basket, original placement of solid product) of a container are compared.

Next to help quantify this urea acceleration effect, the basket containing the solid $CaCl_2$ or $CaCl_2$/urea mixture was weighed separately over time after being held in these humidity conditions. This was compared to the weight of the bottom basin over time which contained only liquid brine. FIG. 2 illustrates the weight of the separate compartments (basket only vs. basin only) in a building staircase in summer (Memphis, Tenn.). All trials were run in the staircase of the building. The staircase was an uncontrolled, non-air conditioned area that is subject to temperature and humidity changes throughout the day. The experiment was conducted in the staircase to simulate real life fluctuations.

Urea creating brine faster was supported by data in FIG. 2. FIG. 2 was compiled from data from the two containers placed within a staircase. They showed a significant difference in rate of weight lost from the basket and gained by the bottom of the container.

In FIG. 2, the graph depicted the changes in weight of the separate compartments (basin vs. basket) of a container. This showed the different weight changes between the basket and the bottom of the container in the presence and absence of 10 weight % urea. Visual evidence was observed throughout the experiment with urea forming a brine faster than a container without urea. Note the circles where the basket weights and basin weights converge. This point was where the basin weight exceeded the weight of the basket that holds the $CaCl_2$). The container with urea converges almost 300 hours before the container without urea.

Figure 3:
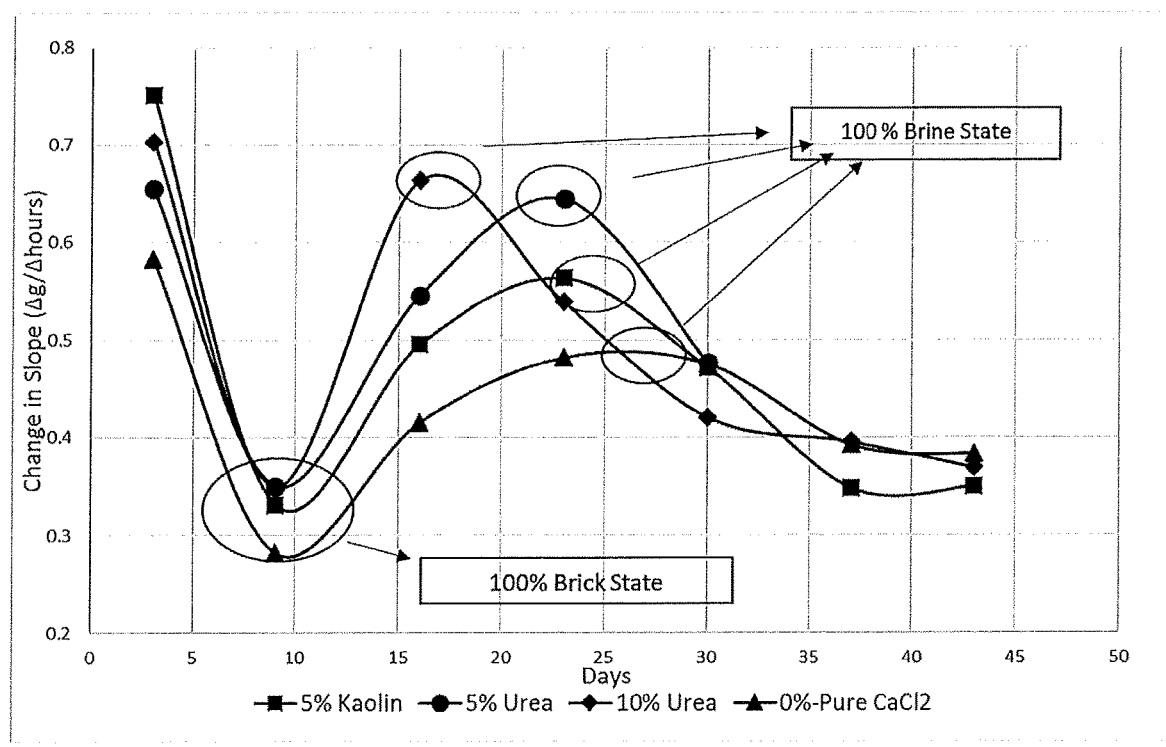
FIG. 3 is a graph depicting the change in slope versus time in days further illustrating the benefit of faster brine formation from adding urea and low levels of clay to flake calcium chloride desiccant.

Further investigation led to plot of a graph of the slope versus the change in time to see how the different states of $CaCl_2$) affected the rate of brine formation in FIG. 3. FIG. 3 suggested that initial exposure to humidity displays the greatest slope (highest peak). This was suggestive that $CaCl_2$ flakes initially gain weight rapidly. A dramatic decrease in the slope of weight gain was seen when the $CaCl_2$ flakes had turned into a "brick" state (FIG. 3). The rate at which moisture was absorbed by $CaCl_2$ depended upon its surface area. There was more surface area when $CaCl_2$ was in its initial granular phase. Once the $CaCl_2$ turned into a "brick," the surface area decreased. Another peak was observed when the $CaCl_2$ was coming out of its "brick" state and forming a brine. This was also attributed to surface area. As brine started to form, it increased the surface area of the $CaCl_2$ to absorb more moisture. This was where urea was believed to have turned from its brick state into its hybrid state faster. After brine formation began, the slopes show gradual decrease as $CaCl_2$ headed towards its maximum absorption capacity into its brine state.

FIG. 3 also illustrates a plot of pouches (each 3⅞ inches wide×7.5 inches long, 1 inch side gusset, ½ inch seal at bottom) containing $CaCl_2$ with different amounts of urea and clay (Kaolin) showing change in slope of weight gain (g) versus time (days)—tested within a humidity chamber. At day 9, most of the pouches had reached a brick state. The transition to a 100% brine state occurred faster at day 16 for the pouch containing 10 weight % urea. Also, the pouch with 5 weight % urea was 100% in its brine state at day 20. The pouch containing 5 weight % Kaolin reached a 100% brine state at day 23. The control pouch containing no urea reached a 100% brine state at day 29.

Example—Starch and Absorption Control

Figure 5:
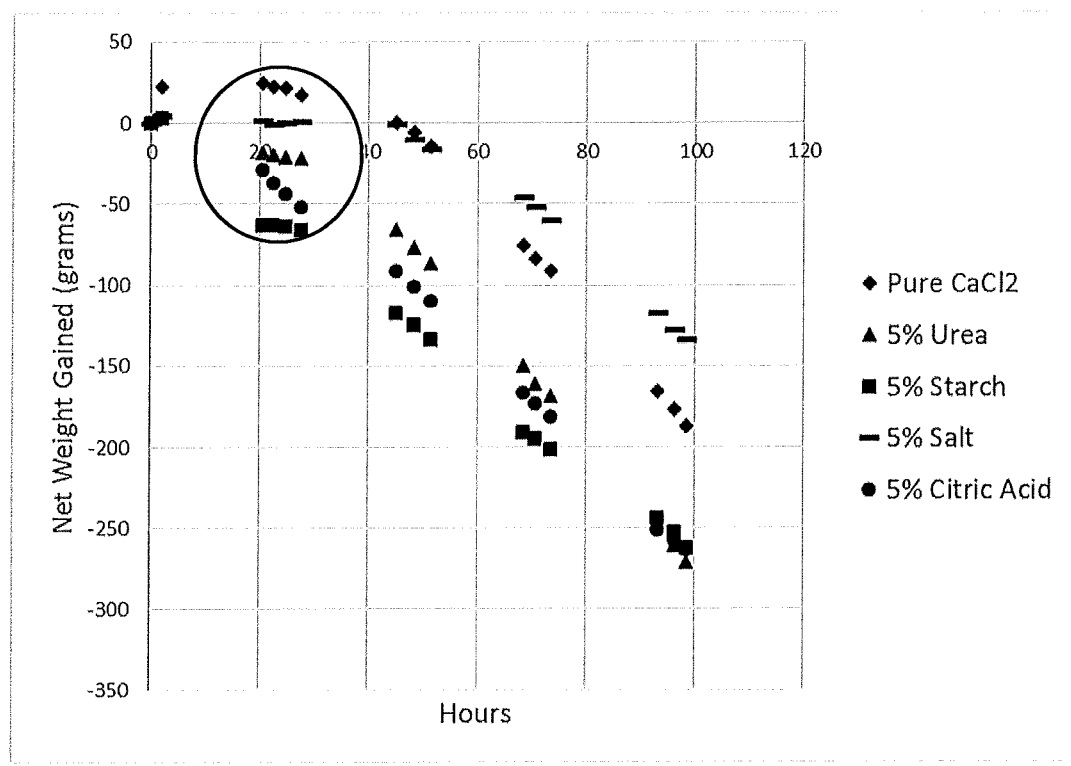
FIG. 5 is a graph depicting the benefits resulting from the ability of starch, citric acid, and urea to initially decrease the amount of calcium chloride in the basket of a two compartment system and start forming brine faster.

Starch was added to various pouches (each 3⅞ inches wide×7.5 inches long, 1 inch side gusset, ½ inch seal at bottom) at different concentrations of starch. For this experiment, the pouches were made to contain various compositions of starch at a set total weight of 10.5 oz. Initial data suggested that addition of lower levels of starch (5 weight %) surprisingly sped up the absorption rate of $CaCl_2$, as more brine seemed to appear faster than pouches containing straight $CaCl_2$. As shown in FIG. 5, pouches of $CaCl_2$ blended with different amounts of starch were placed in an automobile in summer (Memphis, Tenn.). The 5 weight % starch value had higher weight gain than the control throughout most of experiment, up until the point where there was 100% liquid brine in the pouch. It was also noticed that when the pouches reached a 100% brine state that the control pouch containing 10.5 oz. of $CaCl_2$ gained more weight than pouches containing starch. This indicated that starch seemed to also lower the absorption rate when the liquid brine state was reached. A slower absorption rate in this state prevented the pouch from ballooning and leaking, which had been seen in pouches containing only $CaCl_2$.

Thus, there is a synergistic effect with the urea and the starch such that the urea facilitates the formation of brine faster and starch slows down the rate of absorption when it has reached the 100% brine state. This is an advancement over pouches made with straight $CaCl_2$ that continue to absorb moisture when $CaCl_2$ is at its 100% brine state causing the pouch to essentially balloon and leak brine solution out of the pouch.

Example 4—Urea and Stabilization of Brine State

Another problem that was seen was the formation of stalagmite looking structures upon recrystallization of the $CaCl_2$ at lower humidity. This recrystallization within the draining holes of the DampRid® FG91 product (having a two compartment system consisting of a basket where the $CaCl_2$ flakes are placed and a bottom basin to catch the brine as the $CaCl_2$ absorbs moisture from the environment) and the Aero 360, UniBond (Henkel) product caused unwanted leaking. The inability of the brine to drain in the basin led to pooling in the top compartment. If liquid stays in the top compartment and is shifted in anyway, brine pours out of the sides of the container. Urea eliminated the formation of stalagmites after the brine state. Decreased formation of stalagmites was an important feature to prevent leaking within the containers.

Recrystallization was seen in the bottom of the Aero 360, UniBond product. There was clogging of the drain holes leading into the reservoir in the DampRid® product and the Aero 360, UniBond product. The brine was recrystallizing in the basin where it was a solid brick and could not be poured out by the consumer. The basin could be turned upside down and the brine was stuck within.

Example

Experiments were conducted with a DampRid® product (referred to herein as FG01) having a two-compartment system. The product consisted of a basket where the $CaCl_2$ flakes are placed and a bottom basin to catch the brine as the $CaCl_2$ absorbs moisture from the environment. Testing was done with consistent amounts of $CaCl_2$ kept at 10.5 oz. or 297.7 g in each container. In each experiment, the total container (basket, basin, and lid) was weighed over time. The basket containing the $CaCl_2$ flake mixture and the basin catching the brine were weighed individually as well. The separate compartment weights were taken to see how fast the flakes were attaching $H_2O$ molecules to the $CaCl_2$ and turning into liquid. As the $CaCl_2$ absorbs moisture the basket loses weight as the brine releases to the basin of the container.

In initial experiments, five FG01 containers were placed in the humidity chamber kept at 80% humidity and 26° C. Each container contained 10.5 oz. of $CaCl_2$ as well as 5% of a various other molecule. The four molecules tested in this specific experiment were urea, starch, salt, citric acid (a white crystalline solid commercially available from Alfa Aesar), and a control containing only $CaCl_2$. Data was compiled, and the weight gain of the basin and the weight loss of the basket were analyzed graphically (FIGS. 2 and 3).

Figure 4:
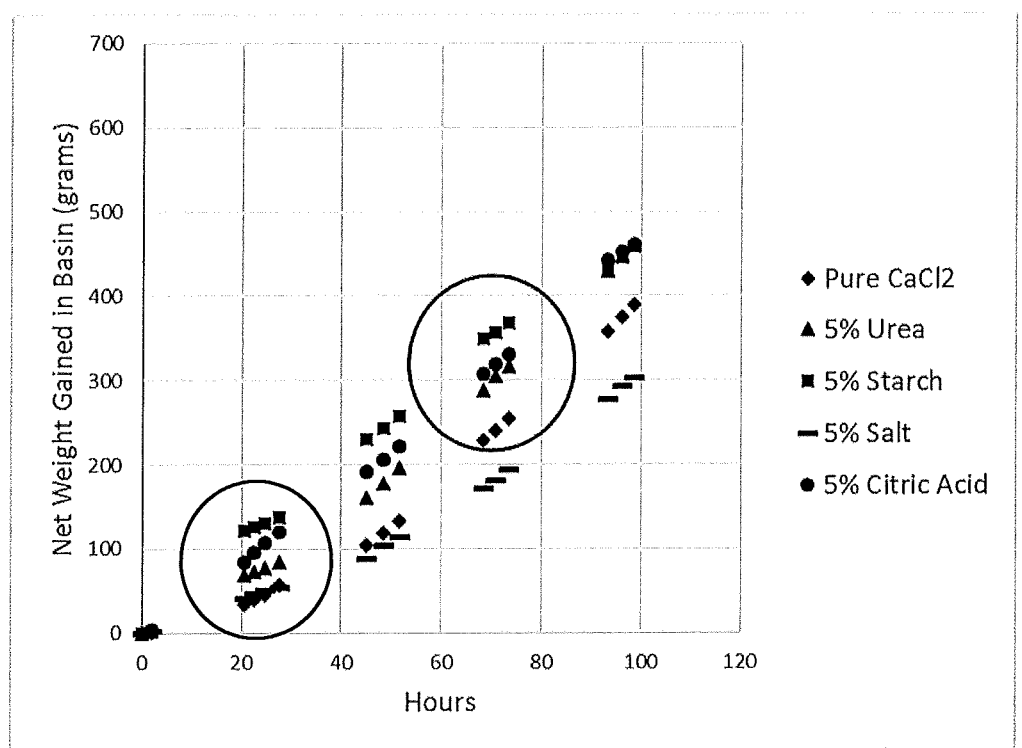
FIG. 4 is a graph depicting the benefits of the presence of starch, citric acid, and urea in increasing initial brine formation in a basket and reservoir system.

In FIG. 4, FG01 data for the basin weight gain recorded from the humidity chamber. Notice the different slopes in the initial weight gain of the basket between 20 and 40 hours (circle). Starch had the most brine formation initially. Citric acid showed the steepest initial slope within the first data points collected. Urea showed the steepest slope after some time had elapsed (circle between 60 and 80 hours). By 100 hours urea, citric acid, and starch data points overlapped.

In FIG. 5, data recorded for the basket weight loss of an FG01 product when placed in the humidity chamber. Notice the initial weight loss trends. Starch and citric acid have a great initial weight loss from the basket while the others have minimal weight loss. It is observed that initially the basket gains weight until $CaCl_2$ attaches enough $H_2O$ molecules from the environment to turn into its brine state. It is observed that initially citric acid and starch started forming brine the fastest thus losing weight from the basket the fastest.

Figure 6:
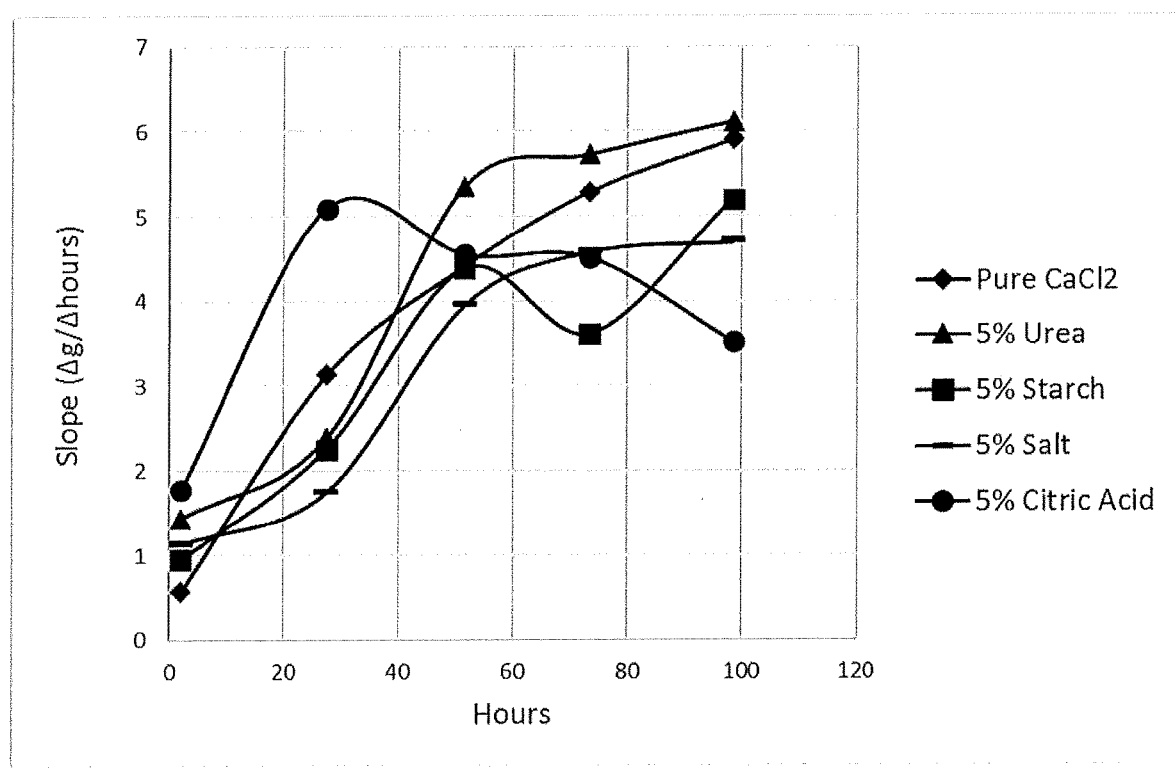
FIG. 6 is a graph depicting the slope versus the change in time further illustrating the benefit of faster brine formation from adding urea and citric acid to the calcium chloride flake desiccant.

In FIG. 6, the initial peak of brine collected in the basin from the citric acid FG01 is seen between 20 and 40 hours (circle). Then a peak is seen in the weight of the brine collected in the basin of the urea FG01 at approximately 60 hours (red circle).

A second experiment was run in the same manner as experiment one. This experiment included the addition of a glucose FG01 and the removal of the salt FG01.

Figure 7:
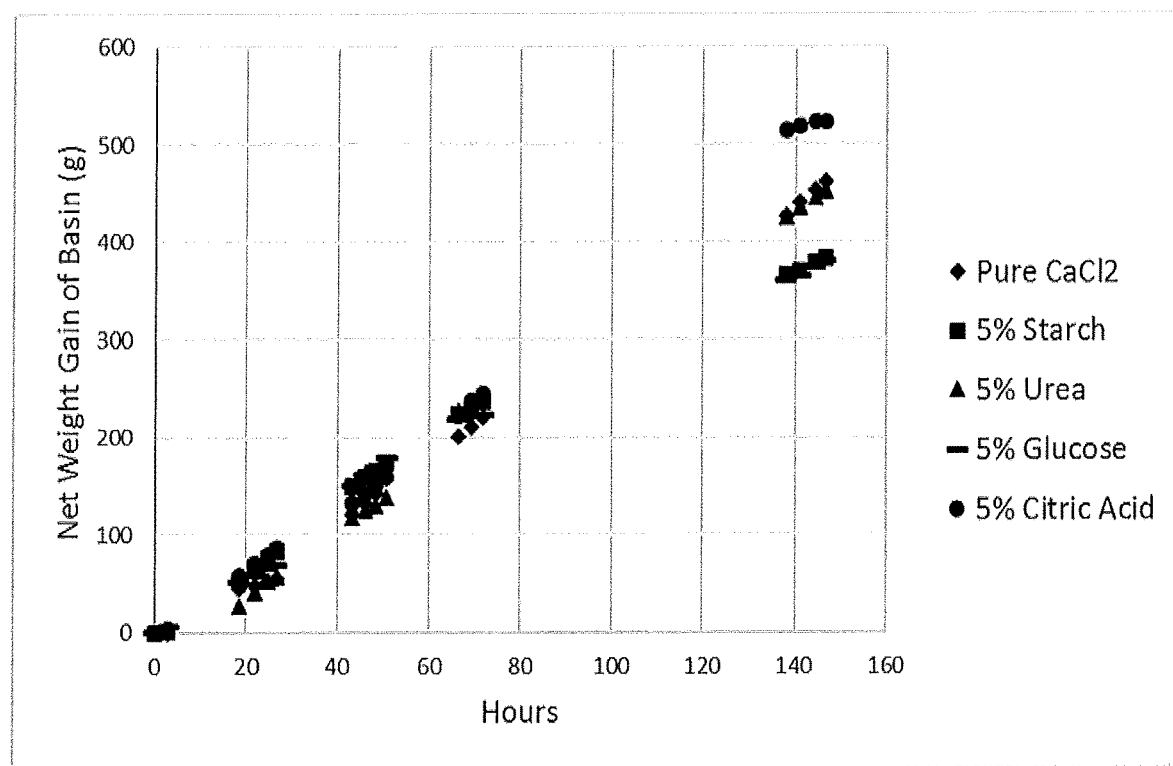
FIG. 7 is a graph depicting extended evidence of the benefits in the presence of starch, citric acid, urea, and glucose in the initial formation of brine over pure calcium chloride alone.

In FIG. 7, FG01 data for the net basin weight gain recorded from the humidity chamber. Notice the initial weight gain of the citric acid containing FG01 (circles) over the opposing containers. Then the brine formation seems to gain consistently throughout the rest of the experiment until it levels off when the $CaCl_2$ is used up. The data depicts glucose (dash) having an effect on the increase of brine formation within an FG01 in the beginning stages and then sharply decreases in the amount of brine formation. Urea showed initially the lowest amount of weight gain in brine. However, by 140 hours it peaks at brine formation. This data follows the same trend in the first experiment.

Observations were also made at the conclusion of the experiment on how much recrystallization occurred within the basin containing the brine.

The containers at the end of experiment one and the recrystallization that occurred in the basin were observed. It was noticed that container 2, carbamide (urea), had significantly less recrystallization than the opposing FG01 containers.

The containers at the end of experiment two and the recrystallization that occurred in the basin were observed. It was noticed that containers holding 5% urea and 5% glucose presented less recrystallization at the conclusion of the experiment.

Example

Figure 8A:
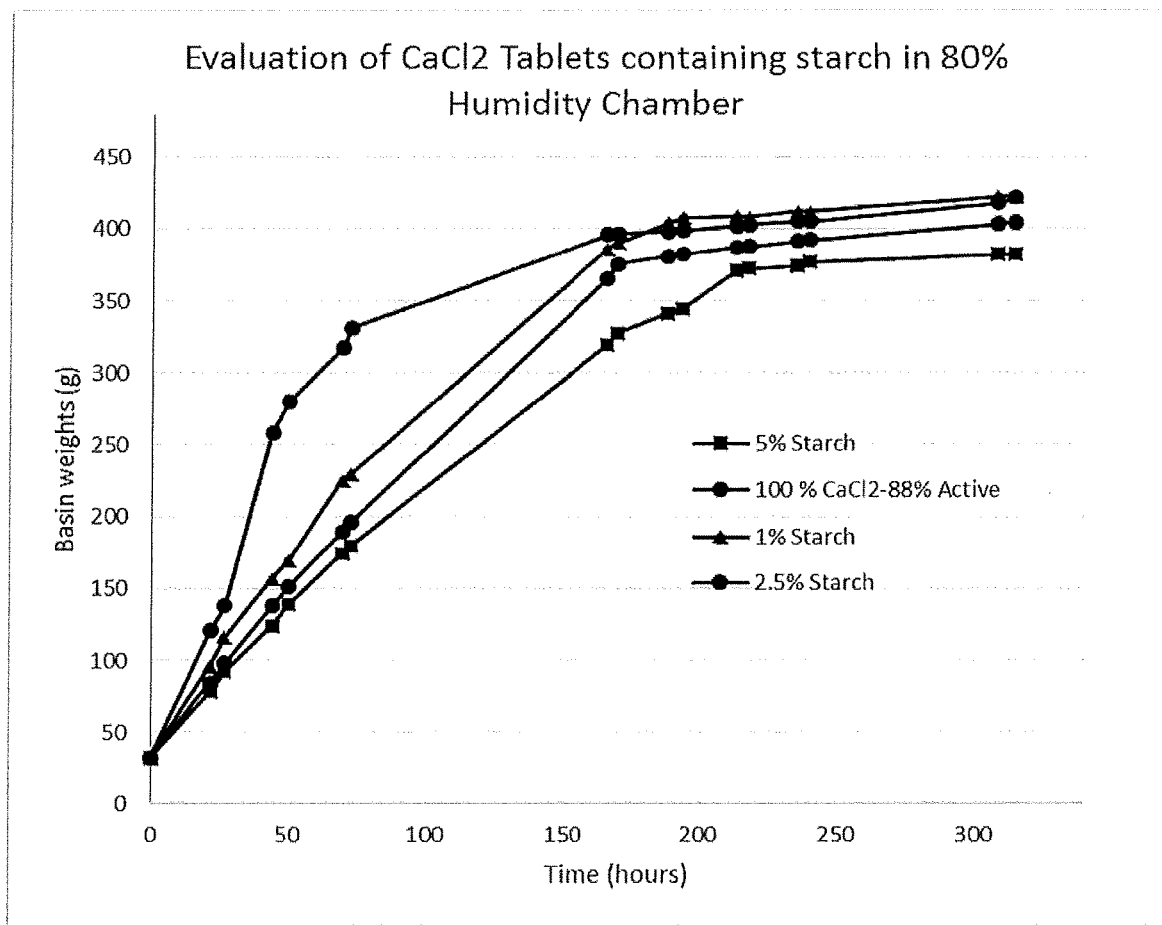
FIGS. 8A and 8B are graphs from an evaluation of calcium chloride tablets containing starch in 80% humidity chamber depicting starch in a compressed tablet lasting longer than a pure calcium chloride tablet.
Figure 8B:
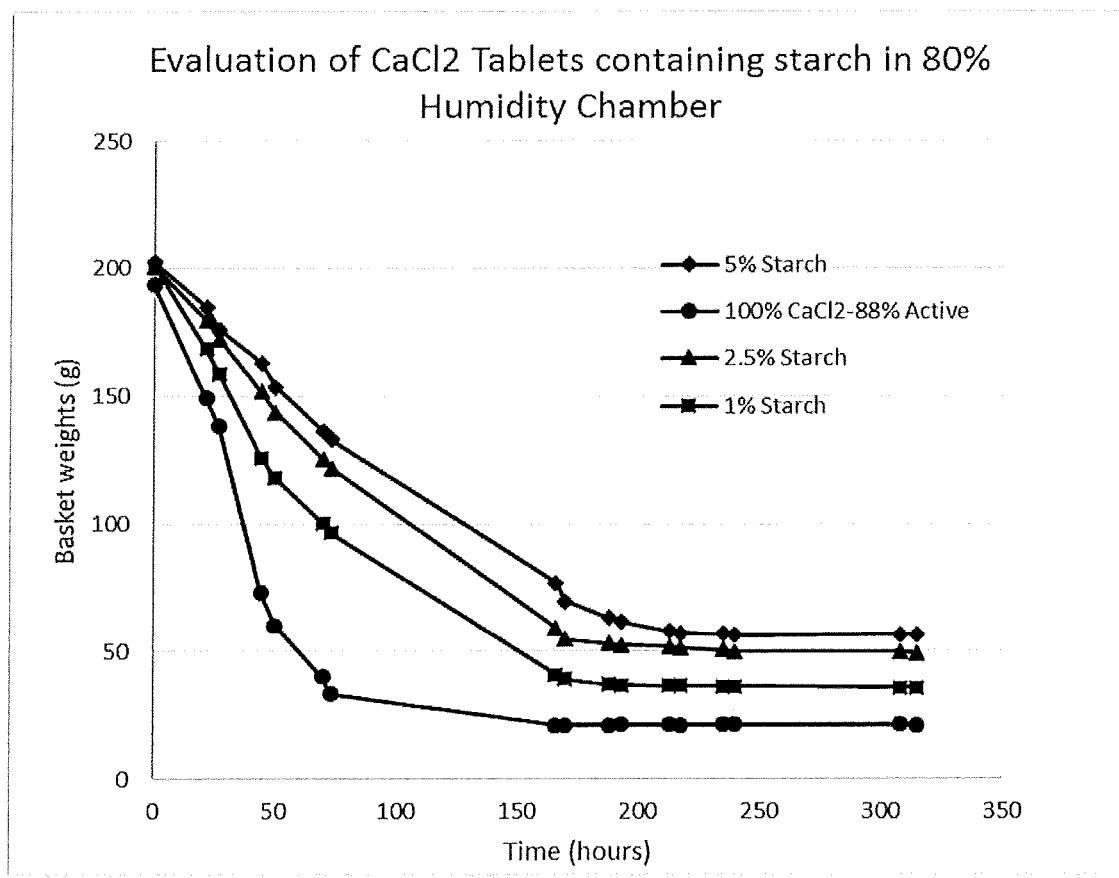

FIGS. 8A and 8B are graphs from an evaluation of calcium chloride tablets containing starch in 80% humidity chamber depicting starch in a compressed tablet lasting longer than a pure calcium chloride tablet. Calcium chloride tablets containing starch were evaluated in a basket and basin product, in a 80F, 80% humidity chamber. Pure $CaCl_2$ tablets turned all into brine around 75 hours while tablets containing starch turned are all into brine at around 160 hours. FIGS. 8A and 8B illustrate starch in a compressed tablet lasting longer than a pure calcium chloride tablet. Thus, it was concluded that starch in a calcium chloride tablet slows down brine formation.

Table 1 has example formulations for tablets comprising $CaCl_2$, starch and urea in accordance with the present invention.

TABLE 1

| | 1 wt % | 2 wt % | 3 wt % | 4 wt % | 5 wt % | 6 wt % | 7 wt % | 8 wt % | 9 wt % | 10 wt % | 11 wt % | 12 wt % | 13 wt % | 14 wt % |
|---|---|---|---|---|---|---|---|---|---|---|---|---|---|---|
| $CaCl_2$ | 99 | 98 | 96.5 | 94 | 93.5 | 99 | 100 | 98.5 | 97 | 94.5 | 93 | 92.8 | 98.3 | 93.8 |
| Urea | | | | | 5 | | | | | | 5 | 5 | | 5 |
| Tylose | | 1 | 2.5 | 5 | 1 | | | 1 | 2.5 | 5 | 1 | 1 | | |
| Mg Stearate | 0.5 | 0.5 | 0.5 | 0.5 | 0.5 | 0.5 | | 0.5 | 0.5 | 0.5 | 0.5 | 0.5 | 0.5 | 0.5 |
| Sipernat 500 LS | | | | | | | | | | | | 0.2 | 0.2 | 0.2 |
| PEG 8000 | 0.5 | 0.5 | 0.5 | 0.5 | | | | | | | | | 0.5 | |
| Lactose | | | | | | 0.5 | | | | | | | | |
| Fragrance | | | | | | | | | | | 0.5 | 0.5 | 0.5 | 0.5 |

Note:
weight % is based on weight % of tablet

Example

Figure 9:
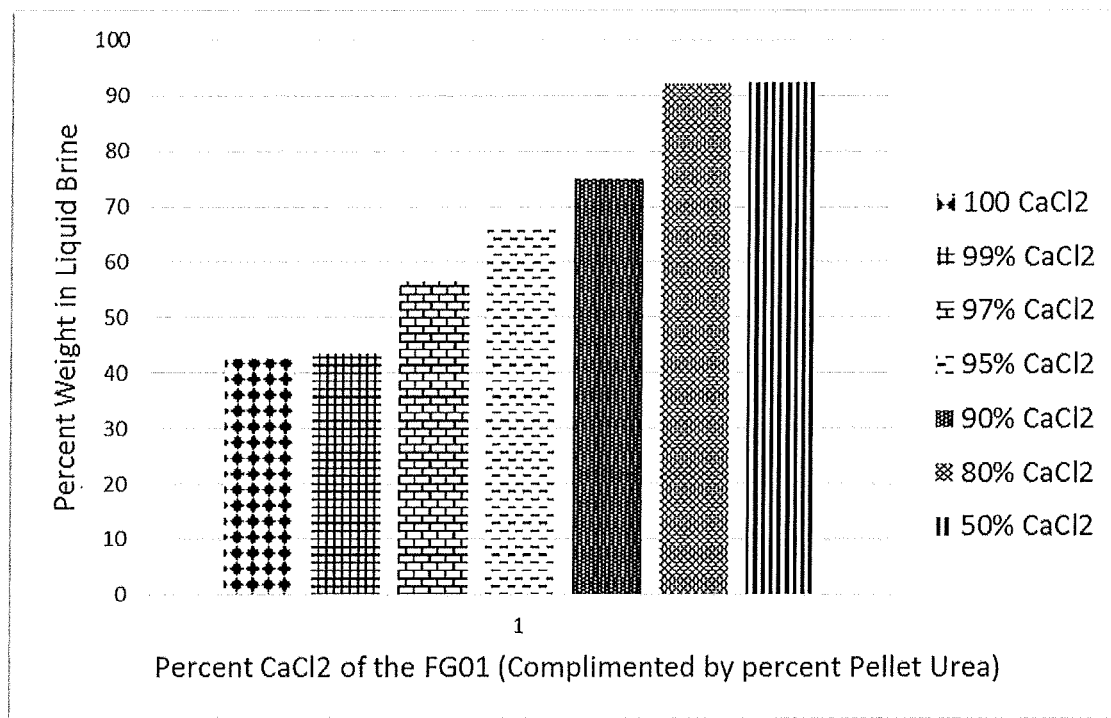
FIG. 9 is a graph of percent weight in liquid brine versus percent $CaCl_2$ of the DampRid FG01.

Experiments were conducted to show how urea affects recrystallization. Weights were taken of a basin collecting brine from $CaCl_2$ and various percentages of urea. These values were used to quantify the percent liquid brine formed versus how much recrystallization was occurring within the basin. FIG. 9 demonstrates that as the urea level is increased, the percent weight in liquid brine increases. This displays how urea prevents recrystallization of $CaCl_2$ brine.

Example

Table 2 has example compositions of tablets with approximate weights of 175 grams.

TABLE 2

| Component | Weight % |
|---|---|
| $CaCl_2$ | 93.8 |
| Urea | 5 |
| Mg Stearate | 0.5 |
| Sipernat 500 LS | 0.2 |
| fragrance | 0.5 |

Example

The following compositions of urea in the tablet were tested. The compositions were tested for optimizing urea level in the 175-gram tablet.

TABLE 3

| | Component | | | | | | | |
|---|---|---|---|---|---|---|---|---|
| | I | II | III | IV | V | VI | VII | VIII |
| % $CaCl_2$ | 88.5 | 78.5 | 68.5 | 58.5 | 92.5 | 85.5 | 83.5 | 48.5 |
| Urea | 15 | 20 | 30 | 40 | 5 | 10 | 10 | 50 |
| Starch D | 1 | 1 | 1 | 1 | 1 | 1 | 1 | 1 |
| Mg Stearate | 0.5 | 0.5 | 0.5 | 0.5 | 0.5 | 0.5 | 0.5 | 0.5 |
| Blue Carbonate | 0 | 0 | 0 | 0 | 1 | 3 | 5 | 0 |

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A composition consisting essentially of:
   a deliquescent desiccant in a form of a solid,
   solid urea, and
   optionally, a solid component selected from the group consisting of sodium citrate, starch, citric acid, clay, glucose, a carbohydrate, carbohydrate encapsulated fragrance, and a combination thereof,
   wherein the deliquescent desiccant is calcium chloride and the calcium chloride is present in the composition at an amount greater than 20 weight percent of the composition.

2. The composition according to claim 1, wherein calcium chloride is present in the composition in an amount in a range of 50 weight percent to 97 weight percent of the composition.

3. The composition according to claim 1, wherein the composition is in the form of a granular, a pellet, a powder, or a flake mixture.

4. The composition according to claim 1, wherein the composition is in the form of a pressed tablet.

5. A composition consisting essentially of:
   a deliquescent desiccant in a solid form, and
   solid urea,
   wherein the deliquescent desiccant is calcium chloride and the calcium chloride is present in the composition at an amount greater than 20 weight percent of the composition.

6. The composition according to claim 5, further consisting essentially of:
   a component selected from the group consisting of sodium citrate, starch, citric acid, clay, glucose, a carbohydrate, carbohydrate encapsulated fragrance, and a combination thereof.

7. The composition according to claim 5, wherein calcium chloride is present in the composition in an amount in a range of 50 weight % to 97 weight % of the composition.

8. The composition according to claim 5, wherein urea is present in the composition in an amount of up to 50 weight percent of the composition.

9. The composition according to claim 5, wherein the urea is present in the composition in an amount in a range of 1 weight percent to 50 weight percent of the composition.

10. The composition according to claim 5, wherein the composition is in the form of a granule, a pellet, a powder, or a flake mixture.

11. The composition according to claim 5, wherein the composition is in the form of a pressed tablet.

12. The composition according to claim 6, wherein the starch is present in the composition at an amount in a range of 1 weight percent to 50 weight percent of the composition.

13. The composition according to claim 6, wherein the clay is present in the composition at an amount in a range of 1 weight percent to 10 weight percent of the composition.

14. The composition according to claim 5, further consisting essentially of fragrance, starch encapsulated fragrance, fragrance beads, carbohydrate encapsulated fragrance, or a combination thereof.

15. A method of using a composition, the method comprising:
adding a composition consisting essentially of a solid deliquescent desiccant and urea in a form of a solid to a dehumidifying device to increase a rate of brine formation in the dehumidifying device as compared to a dehumidifying device having a solid deliquescent desiccant but no solid urea.

16. The method of using the composition according to claim 15, wherein the deliquescent desiccant is selected from the group consisting of calcium chloride, magnesium chloride, potassium chloride, lithium chloride, and a combination thereof.

17. A method of using a composition comprising:
adding a composition consisting essentially of a solid deliquescent desiccant and urea in a form of a solid to a dehumidifying device to prevent brine from recrystallizing in the dehumidifying device with decreasing humidity conditions.

18. The method of using the composition according to claim 17, wherein the deliquescent desiccant is selected from the group consisting of calcium chloride, magnesium chloride, potassium chloride, lithium chloride, and a combination thereof.

19. A dehumidifying device comprising:
a composition consisting essentially of a solid deliquescent desiccant, urea in a form of a solid, and an optional component selected from the group consisting of sodium citrate, starch, citric acid, clay, glucose, a carbohydrate, carbohydrate encapsulated fragrance and a combination thereof, and wherein the solid deliquescent desiccant is calcium chloride and the calcium chloride is present in the composition at an amount greater than 20 weight percent of the composition.

20. The dehumidifying device according to claim 19, wherein the dehumidifying device is in a form of a pouch, a hanging bag, or a container.

21. The dehumidifying device according to claim 20, wherein the hanging bag is a multi-compartment hanging bag having an upper half and a lower half.

22. The dehumidifying device according to claim 21, wherein the multi-compartment hanging bag has two or more compartments.

23. The dehumidifying device according to claim 19, wherein the composition is present in the upper half of the hanging bag.

* * * * *